Feb. 6, 1934.  H. KREIDEL  1,945,554
SIPHON LUBRICATOR FOR SUCTION AND PRESSURE LUBRICATION
Filed Dec. 11, 1931
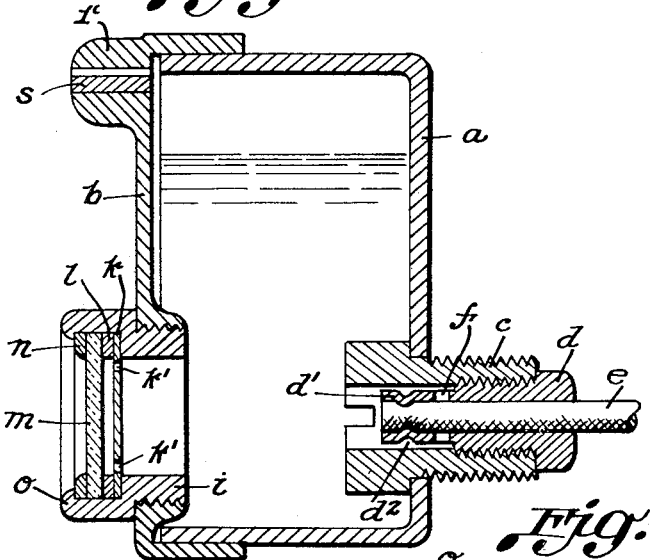
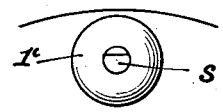
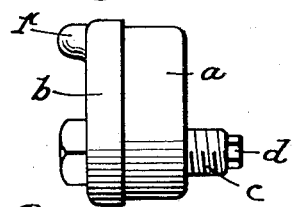
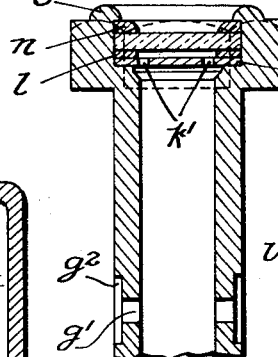
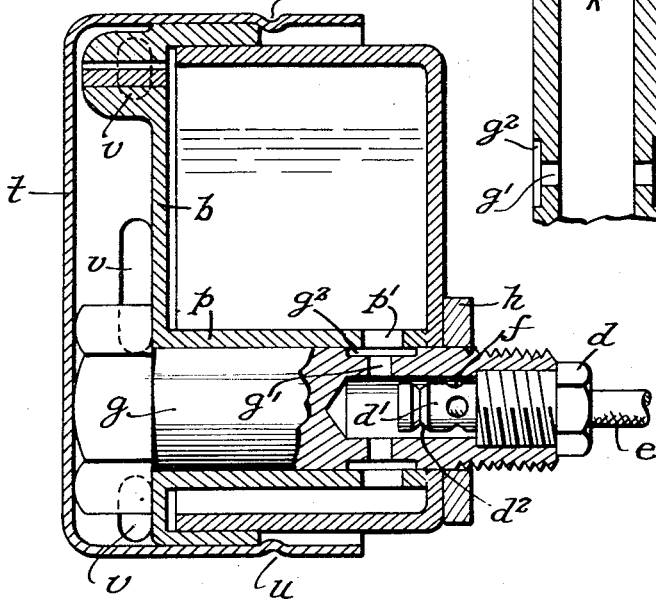
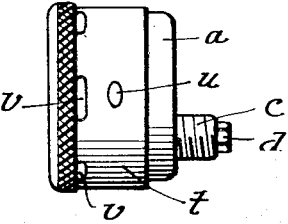
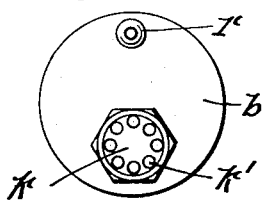
Inventor:
Hans Kreidel.
By: Williams, Bradbury, McCaleb & Hinkle
Attys.

Patented Feb. 6, 1934

1,945,554

UNITED STATES PATENT OFFICE 1,945,554

SIPHON LUBRICATOR FOR SUCTION AND PRESSURE LUBRICATION

Hans Kreidel, Wiesbaden, Germany

Application December 11, 1931, Serial No. 580,468, and in Germany December 22, 1930

4 Claims. (Cl. 184—64)

The present invention relates to a lubricator which has an oil flow regulating device installed in its attachment part and answering all requirements of a high class lubricator suitable for industrial purposes and more especially for use in aircraft and motor driven vehicles, and which can be manufactured at reduced cost. The lubricator is made of drawn sheet metal parts and is able to withstand high pressures; it is adapted to be used with high pressure lubricating pumps for replenishing and lubricating purposes and has a special connection from the oil chamber to the atmosphere which efficiently prevents all impurities and water from entering the said oil chamber. The lubricator is also fitted with a level gauge which may be inspected from the outside.

The oil chamber and the attachment screws are constructed as separate parts and are not connected before fitting the lubricator with the object to enable the lubricator to be fixed without tilting or turning the oil chamber.

The accompanying drawing shows by way of example two possible embodiments of the invention.

Fig. 1 is a section through the lubricator with the attachment screw arranged in the chamber rear wall and directly bearing upon it, Fig. 2 shows a section of the lubricator fitted with a protecting cover, the attachment screw passing through a tubular part inserted in the oil chamber, Fig. 3 is a section through the front end of the attachment screw shown in Fig. 2 fitted with an oil level gauge, Fig. 4 is a view from above on the oil filler spout, Fig. 5 is a view of the lubricator with the protecting cover removed to a reduced scale, Fig. 6 is a view of the same lubricator fitted with the protecting cover, Fig. 7 is a plan view of the same lubricator without protecting cover.

In Figs. 1 and 2 $a$ designates the reservoir body and $b$ the cover part united to one another by soldering or welding for example. The attachment screw $c$ is made hollow to receive the plug $d$ of the oil flow regulating device, and in the example shown, the oil flow is regulated by means of a wick $e$ which is so fitted in the small space that is disposable for this purpose that the oil which may flow in both directions cannot compress or loosen it. For this purpose the wick carrier $d$ located in the attachment screw $c$ is provided with a tubular extension $d^1$ in the rear having a diameter that is smaller than the inner diameter of the bore of the attachment screw so as to form a free annular space.

The bore of the wick carrier is so dimensioned and the wick in it is so compressed that the passage that is obtained answers that quantity of the lubricant which is required to pass therethrough.

A grooved part $d^2$ of the tubular end $d^1$ serves to hold the wick $e$ so that it cannot be displaced; the wick being so compressed at this place that no oil or a very minute quantity only can pass and that the oil is compelled to flow through the holes $f$ that have been provided in front of the grooved part $d^2$ of the tubular extension $d^1$ of the wick carrier $d$. In this way the lubricant can flow through the wick $e$ in either direction without causing a rupture or a displacement of the said wick.

As has been shown in Fig. 1 the opening in the cover part opposite the attachment screw $c$ is provided with an internal thread into which fits a threaded cap $i$ which may be constructed to serve as a level gauge. This oil level gauge consists of a preferably white painted disc $k$ with holes $k^1$ and a glass $m$ in front of it with the interposition of a gasket ring $l$. A metallic ring $n$ has also been provided to secure ample protection for the glass. The parts of the oil level gauge tightly fit onto one another, the tight fit being obtained by bending the threaded cap $i$ appropriately at its place $o$.

In the example of execution shown in Fig. 1 the body $a$ of the oil chamber directly stands the stress caused by the attachment screw $c$ and the screw head is in the interior of the said oil chamber.

In the execution shown in Fig. 2 an attachment screw $g$ passes through a tubular part $p$ located in the interior of the oil chamber and serves as a connecting member between its cover and body. The head of the attachment screw $g$ remains outside the oil chamber and its pressure effort is transmitted to the chamber bottom by means of the tubular part $p$. Radial borings $p^1$ are provided in this tubular part $p$ near the bottom and these borings communicate with the borings $g^1$ of the attachment screw $g$ which also has recesses $g^2$ near the said borings $g^1$ that enable a passage of the lubricant. The lubricant thus passes from the oil chamber through the said bores and recesses to the wick regardless of the position that the attachment screw may assume.

The tubular part $p$ which is interposed between the body and the cover of the oil chamber prevents a deformation of the latter on tightening the attachment screw and a washer $h$ may be provided to tighten the place where the attachment screw enters the body of the oil chamber. The attachment screw g of Fig. 2 may as has been shown in Fig. 3 be hollowed out or made of a piece of tubular material while its head part may be so constructed that it can serve as an oil level gauge substantially as indicated in Fig. 1.

A filler nipple r is provided at the uppermost position of the cover b and serves as a connecting means for a high pressure lubricating pump, the outside of this nipple being so shaped that it fits the spout of the pump. The oil inlet opening or its air vent must always remain open since the oil contained in the oil chamber must be kept under atmospheric pressure to enable the oil to flow out. The oil filler opening or the air vent of the nipple must be of a reduced size and must be arranged at the highest part of the lubricator. This purpose has been attained by providing a profiled part s in the nipple passage which can be made of a piece of appropriately flattened out material (Figs. 1, 2 and 4).

Impurities and water must be prevented from entering the bore of the nipple that always must be kept open, since water with its higher specific weight would prevent an operation of the lubricator, while impurities would tend to clog the very sensitive oil flow regulating device.

Considering the case of a motor-driven vehicle in which on the occasion of cleaning it a high pressure water spray would be directed against the open nipple. A few minutes would in this case suffice to prevent the oil flowing out of the lubricator owing to the influence of the water that has entered through the nipple.

In order to prevent an entering of all impurities and water, the lubricator has been provided with a protecting cover t (Fig. 2) that can easily be put on and removed by hand. The protecting cover is loosely slid over the chamber cover part b and is held in place by two pressed in nose parts u that pass over the brim of the reinforced part of the lubricator. A certain effort will always be required to put on or to remove this protecting cover in consequence of the spring action provided by the afore mentioned nose parts.

Slots v are provided in the protecting cover t that serve as an entrance opening for the air and as an exit for the water. These slots are so placed that with protecting cover in place on the lubricator, they assume positions such that their inner edges are substantially in the plane of the outer surface of the wall b. The cover thus prevents water from being sprayed directly into the filling channel, while the slots provide adequate drainage openings to permit rapid draining of any water which may have been sprayed into the space between the cover and wall b of the lubricator, and admit air to the filler opening to prevent the formation of a partial vacuum in the reservoir of the lubricator. The protecting cover is provided with ribs or is knurled over part of its surface to ensure ease of handling.

Having thus described my invention, what I claim as new and desire to secure by Letters Patent is:

1. A combined capillary, gravity, and high pressure lubricator comprising, a rigid lubricant chamber having at its uppermost part a lubricant receiving fitting adapted for connection with a high pressure lubricant pump, a hollow attachment screw mounted for rotation in said chamber, said screw having openings communicating with the interior of said chamber, an apertured wick carrier secured in said screw and provided with a tubular part of lesser diameter than the hollow portion of said screw thereby to form an annular space for lubricant, and a wick secured in said carrier and communicating with said annular space through the apertures in said carrier.

2. A lubricator comprising, a container, a lubricant receiving fitting and air vent positioned at the top of said container, said fitting being constructed and arranged for connection with a high pressure lubricant pump, a tubular element projecting into said container from one of the side walls thereof, a screw for attaching said container to a part to be lubricated projecting through the walls of said container and through said tube, said tube and screw having communicating passageways, and a wick carrier removably secured in the end of the passageway formed in said screw.

3. A capillary lubricator comprising, a lubricant container having an open end tube extending through the container and having oil feed apertures therein, a screw for attaching said container to a part to be lubricated bearing in said tube and having passageways positioned to communicate with said apertures in said tube, the end of said screw having a bore communicating with said passageways, a wick carrier threaded in said bore of said screw, and a wick tightly secured in said carrier.

4. In a lubricator, the combination of a rigid container having an open end transverse tube extending thereacross adjacent the bottom thereof, an axially bored attachment screw bearing in said tube and extending through said container, said attachment screw and tube having communicating passageways whereby lubricant may flow from said container to the bore of said attachment screw, a wick secured to said screw at one end thereof and a transparent disc secured in said screw at the other end of said bore and forming a closure therefor and serving as a window through which the level of the oil in the bore of said screw may be observed.

HANS KREIDEL.